(No Model.)
J. C. ANDERSON.
UNICYCLE.
No. 550,399. Patented Nov. 26, 1895.
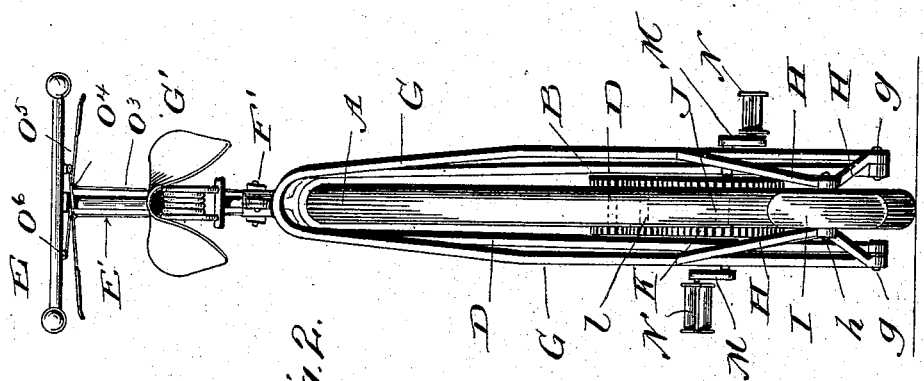
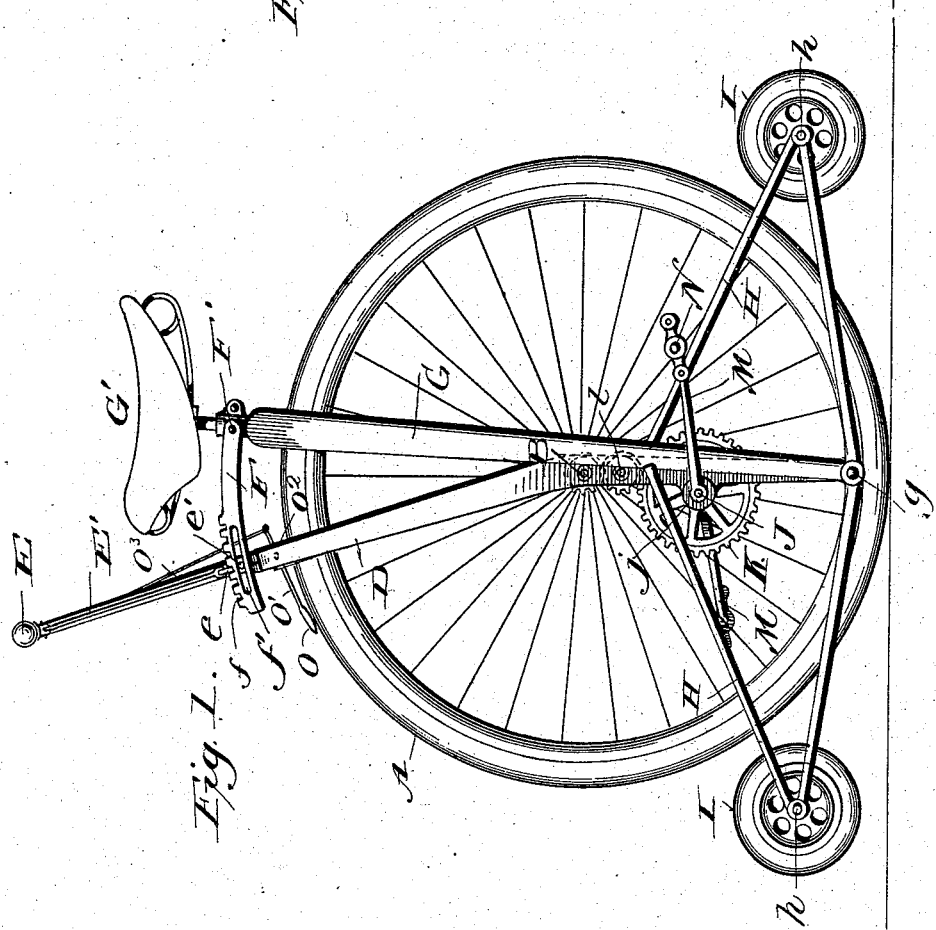
Witnesses:
L. C. Hills.
E. H. Bond
Inventor:
James C. Anderson,
by Thomson Jay Hudson,
Atty.

UNITED STATES PATENT OFFICE.

JAMES C. ANDERSON, OF HIGHLAND PARK, ILLINOIS.

UNICYCLE.

SPECIFICATION forming part of Letters Patent No. 550,399, dated November 26, 1895.

Application filed December 17, 1894. Serial No. 532,083. (No model.)

*To all whom it may concern:*

Be it known that I, JAMES C. ANDERSON, a citizen of the United States, residing at Highland Park, in the county of Lake and State of Illinois, have invented certain new and useful Improvements in Unicycles; and I do hereby declare the following to be a full, clear, and exact description of the invention, such as will enable others skilled in the art to which it appertains to make and use the same.

This invention has relation to velocipedes, but pertains more particularly to that class known as "unicycles;" and it has for its object, among others, to provide a simple and comparatively inexpensive wheel composed of few parts and these so constructed and arranged as to insure the safety of the rider and enable him to acquire great speed. The frame of the machine is of novel construction, being arranged so as to throw the point of support below and in line with the center or axis of the wheel. Safety-wheels are provided upon opposite sides of and in line with the main wheel. The propelling means comprises gear-wheels fast upon the crank-shafts, gears upon the axle of the main wheel, and idlers carried by stub-axles located between the point of support and the axis of the main wheel. A locking-lever is provided, which is arranged within convenient proximity of the seat, enabling the rider to adjust and maintain the frame and wheel at any desired angle and also to throw either of the safety-wheels into engagement with the ground when desired.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation of my improved unicycle. Fig. 2 is an end view thereof.

Like letters of reference indicate like parts in both of the views.

Referring now to the details of the drawings by letter, A designates a wheel of any well-known or approved construction, provided with any desired style of tire, either solid, cushion, or pneumatic, as may be preferred. B is the axle of this wheel, and fastened thereon upon opposite sides of the hub thereof are the small gear-wheels C. This axle is mounted in the fork D, which at its upper end embraces the wheel A, as shown, and which terminates in a handle or lever E, which in this instance is shown as provided with a pawl e, actuated by means of a rod E', said pawl being designed to engage in any of the notches f of the notched segment F, as seen best in Fig. 1, which segment is supported in a position concentric with the periphery of the wheel, in this instance being shown as pivotally secured, as at F', to the upper end of the frame G, which is in the form of a fork, the upper end of which embraces the wheel A, as shown, and which has a socket to receive a saddle or seat G' of any well-known or approved construction held therein in any desired manner. This segment F has a longitudinal slot f', in which works a laterally-projecting pin e' on the handle or lever E, and by which the latter is guided in its movements, as will be readily understood from Fig. 1. The fork or frame G extends substantially perpendicularly, as shown, and its lower end terminates at a point substantially in vertical line with the axle B of the main wheel and in close proximity to the lower periphery of said wheel, so as to throw the point of support from the seat of the rider a distance below the central axis and in substantially vertical line with the axle of said wheel, the fork D being extended, as shown, and the two pivotally united, as shown at g.

H are brace arms or rods extending from the fork or frame G at points upon opposite sides of the main wheel, as shown, said brace-arms converging toward each other from the lowermost point of the frame and at the point between the same and the axle B, and in the outer ends of these two said arms is mounted the axle h, carrying the safety-wheels I, of any suitable construction.

Crank-shafts J are mounted in lugs j on the fork D below the axle B, and on these shafts are secured the large gears K, which mesh with idler-gears L, carried by shafts l, mounted in the fork D, one upon each side of the main wheel A, and which gears L in turn mesh with the gears C on the axle B, it being understood, of course, that there is a set of gears C, L, and K upon each side of the main wheel, as shown in Fig. 2.

M are the cranks on the stub-shafts J, and N are the pedals, these latter parts being of any well-known or approved form of construction.

With the parts constructed and arranged substantially as hereinbefore described the operation will be apparent.

The lever E is adjusted to regulate the angle at which the same may stand with relation to the frame G, and may be there held fixedly by the means above described; but the lever is normally held loosely by holding the pawl free from engagement with the notched segment, so that the angle may be continually changed by the rider. The point of support being at all times below and in substantially direct line with the axle of the main wheel renders the machine easy and safe riding, and the gears, being arranged in vertical line with and below the center of the main wheel, aid materially in enabling the rider to keep his balance.

Any suitable form of brake may be employed to act upon the periphery of the main wheel A. In this instance I have shown a brake-shoe O, carried by an arm O', pivoted to the fork D, as at $O^2$, and the inner end of said arm having pivotally connected therewith the rod $O^3$, which is pivotally connected, as at $O^4$, with the brake-lever $O^5$, pivoted at one end, as at $O^6$, to the under side of the handle-bar, as seen clearly in Fig. 2, its other end being provided with a handle, as shown in the same view, and which handle is in a plane substantially parallel with the handle-bar, so as to be readily manipulated by the hand of the rider. The rod E', carrying the lever e, is connected with its lever in a similar manner, as clearly shown in Fig. 2.

In order that the operation of the machine may be fully understood, I will remark that the fork D is extended below in line with the axle B, and the fork G, which supports the seat, is extended to a point near the ground and pivoted to the fork D at its extremity. At the upper end there is an adjustable connection between the forks D and G, which permits of the angle between them being varied. The rider, by unlatching the locking device which retains the forks D and G in a certain position, can throw the fork D forward or backward, the same turning on the axle as a pivot, when the point g will be thrown forward or back more rapidly than a point on the fork G, thus throwing the center of gravity of the rider and his support into a vertical line with the support and enabling him to retain his balance. Should he lose his balance entirely, it is the function of the wheels I to prevent the overturning of the fork G forward or backward. Skillful riders are supposed to be able to retain their balance at times under favorable conditions without varying the angle between the forks D and G—in other words, without unlatching the locking device; but this use is manifestly against the proper working of the machine under ordinary circumstances. By mounting the seat of fork G and transferring the vertical thrust incident to the gravity of the rider pivotally to a wrist-pin at the point g near the ground, such wrist-pin being secured to a part pendent of the fork D, said fork extending upwardly to and journaled on the axle of the wheel and then continued upward to form the handle-bars in position to be grasped and controlled by the rider in unison with the thrust of the feet of the rider upon the pedals, which are also journaled to the fork below the axle of the wheel and being pendent on said axle, the latch C being normally open, the various movements and articulations of the body for maintaining equilibrium are brought into mechanical unison and play with the articulations of the machine and are auxiliary thereto and synchronous therewith.

Modifications in detail may be resorted to without departing from the spirit of the invention or sacrificing any of its advantages.

What I claim as new is—

1. In a unicycle, a fork provided with handles and in which the wheel is journaled, and a frame supporting the seat, said fork and frame being pivotally connected at a point below the axle of the wheel, substantially as specified.

2. A unicycle having a fork provided with handles, and a frame supporting the seat, said fork and frame being pivotally connected together at a point near the lower periphery of the main wheel and in substantially vertical line with the center thereof, substantially as set forth.

3. A unicycle having a fork provided with handles and in which the wheel is journaled, and a frame supporting the seat, said fork and frame being pivotally connected at a point below and in vertical line with the center of the main wheel, and having also its propelling means arranged below and in substantially vertical line with the axis of said wheel, substantially as described.

4. The combination with the seat frame extended below the center of the main wheel, of the guiding fork carrying the propelling means and pivotally connected with said frame below the center of the wheel, and safety wheels in front and rear of the main wheel and supported from said frame in line with the main wheel and in proximity to the ground, substantially as described.

5. The combination with the seat frame extended below the center of the main wheel, of the guiding fork pivotally connected with the lower end of the frame and carrying the propelling mechanism, a handle on said fork provided with a latch, and a guiding and locking segment pivotally mounted on the upper end of the frame and concentric with the periphery of the main wheel and adapted to be engaged by said latch, substantially as described.

6. The combination with the seat frame extended below the center of the main wheel, and the guiding fork pivotally connected with the lower end thereof and carrying the propelling mechanism below the axial center of the main wheel, a handle and a lever with a pawl on the upper end of the fork, and a pivotally-mounted curved notched segment mounted on the upper end of the frame for engagement with said pawl, substantially as and for the purpose set forth.

7. The combination with the seat frame extended below the center of the main wheel, and the guiding fork pivotally connected with the lower end thereof and carrying the propelling mechanism below the axial center of the main wheel and substantially in vertical line therewith, a handle and a lever with a pawl on the upper end of the fork, and a pivotally mounted curved notched segment mounted on the upper end of the frame in engagement with said pawl, and having a longitudinal slot, and a pin in said handle working in said slot, substantially as and for the purpose set forth.

In testimony whereof I affix my signature in presence of two witnesses.

JAMES C. ANDERSON.

Witnesses:
HEATH SUTHERLAND,
GEORGE W. COX, Jr.